(12) United States Patent
Beppu et al.

(10) Patent No.: US 8,944,900 B2
(45) Date of Patent: Feb. 3, 2015

(54) GAME PROVIDING SYSTEM, NON-TRANSITORY COMPUTER-READABLE STORAGE MEDIUM STORING GAME PROVIDING PROGRAM AND GAME PROVIDING METHOD

(71) Applicant: DeNA Co., Ltd., Tokyo (JP)

(72) Inventors: Yasunori Beppu, Tokyo (JP); Keisuke Kurita, Tokyo (JP); Sofiya Kovalova, Tokyo (JP); Yuka Yamaguchi, Tokyo (JP); Shunosuke Fujisawa, Tokyo (JP); Shinya Yuki, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/259,982

(22) Filed: Apr. 23, 2014

(65) Prior Publication Data

US 2014/0370949 A1  Dec. 18, 2014

(30) Foreign Application Priority Data

Jun. 14, 2013  (JP) ................. 2013-125620

(51) Int. Cl.
  *G07F 17/32* (2006.01)
  *A63F 13/10* (2006.01)
  *A63F 13/40* (2014.01)

(52) U.S. Cl.
  CPC ..................................... *A63F 13/10* (2013.01)
  USPC ..................................... 463/9; 463/7; 463/25

(58) Field of Classification Search
  USPC .................................... 463/9, 7, 25
  See application file for complete search history.

(56) References Cited

U.S. PATENT DOCUMENTS 8,480,496 B2 *  7/2013  Tomita ........................ 463/42

FOREIGN PATENT DOCUMENTS

| JP | 2001-000739 A | 1/2001 |
| JP | 2006-102123 A | 4/2006 |
| JP | 2011-189073 A | 9/2011 |

OTHER PUBLICATIONS

Japanese Patent Application No. 2013-125620: Decision to Grant a Patent mailed on Jan. 7, 2014.
"Puzzle Craft", [Online], Chillingo Ltd., [Searched on May 29, 2013], the Internet <https://itunes.apple.com/us/app/puzzle-craft/id489178757?mt=8>.
"Dungeon Raid", [Online], FireFlame Games, updated on May 3, 2011 [Searched on May 29, 2013, retrieved on Jul. 12, 2013], the Internet <https://itunes.apple.com/jp/app/dungeon-raid/id403090531?mt=8>.

(Continued)

*Primary Examiner* — Pierre E Elisca
(74) *Attorney, Agent, or Firm* — Procopio, Cory, Hargreaves & Savich LLP (57) ABSTRACT

A game providing system according to an embodiment of the present invention includes one or more processors capable of executing a game program. In one embodiment, the game program includes a conversion rate presentation module configured to present a conversion rate between a first basic point and a first varying point to a player. When a first basic object associated with the first basic point is selected, an acquired point of the player is determined on the basis of the first basic point. When a first varying object associated with the first varying point is selected, the acquired point is determined on the basis of the first varying point.

16 Claims, 8 Drawing Sheets

(56) References Cited

OTHER PUBLICATIONS

Japanese Patent Application No. 2013-125620: Office Action mailed on Jul. 23, 2013.

Drop Game Aiming for High Score through Rate Fluctuations, "Boost Money! Foreign Exchange Puzzle," [online], posted on Mar. 1, 2012, [retrieved on Jul. 12, 2013], Internet <URL, http://flashgamenavi.blog40.fc2.com/blog-entry-479.html>.

* cited by examiner

GAME PROVIDING SYSTEM, NON-TRANSITORY COMPUTER-READABLE STORAGE MEDIUM STORING GAME PROVIDING PROGRAM AND GAME PROVIDING METHOD

BACKGROUND OF THE INVENTION

1. Field of the Invention

The present invention relates to a game providing system, a non-transitory computer-readable storage medium storing a game providing program, and a game providing method. An embodiment of the present invention relates to a game providing system, a non-transitory computer-readable storage medium storing a game providing program, and a game providing method for providing a puzzle game in which a point or an item associated with one or more objects selected by a player are given to the player when the objects are selected from objects placed in a game field.

2. Description of Related Art

Puzzle games in which a point or an item associated with one or more objects selected by a player are given to the player when the objects are selected from objects placed in a game field are known. Examples of such puzzle games in the related art include "Puzzle Craft" provided by Chillingo Ltd., (see "Puzzle Craft,"[online], Chillingo Ltd[retrieved on May 29, 2013], URL: <https://itunes.apple.com/us/app/puzzle-craft/id489178757?mt=8>) and "Dungeon Raid" provided by FireFlame Games (see "Dungeon Raid,"[online], FireFlame Games[retrieved on May 29, 2013], URL: <https://itunes.apple.com/jp/app/dungeon-raid/id403090531?mt=8>). In "Puzzle Craft," objects such as plants, trees and vegetables are placed in 36 respective display areas in a grid-like arrangement of six squares in the vertical direction and six squares in the horizontal direction, and a player can select successive objects of the same kind to acquire a point or a game item associated with the number or the kind of selected objects.

SUMMARY OF THE INVENTION

Such a type of puzzle games are typically designed so that more points or more items can be acquired or damage done to an opponent can be increased, which can make the games advantageous to the player, as the number of successively selected objects is increased. Thus, the only strategy for a player to play such a type of puzzle game advantageously is to increase the number of successively selected objects, which is low in the degree of freedom and likely to become boring for the player.

Such a type of puzzle games are thus often provided in combination with other types of games such as role playing games instead of being provided alone. When a puzzle game and a role playing game are combined, items acquired in the puzzle game can be used in the role playing game, for example. Although the monotony of puzzle games is compensated for by combination with another type of games in this manner, the attempt to enhance the game characteristic (strategic characteristic) of puzzle games themselves is not sufficiently successful.

It is therefore one of objects of the present invention to provide a puzzle game with an enhanced strategic characteristic. In particular, an object of some embodiments of the present invention is to enhance the game characteristic of a puzzle game in which a point to be acquired by a player is determined on the basis of selection of objects placed in a game field. Other objects of the present invention will be apparent by referring to the entire specification.

A game providing system according to an embodiment of the present invention includes one or more processors capable of executing a game program. Furthermore, a game program according to an embodiment of the present invention is configured to make a computer function as a game providing device. In one embodiment, a non-transitory computer-readable storage medium stores the game program including: an object placement module configured to place a first basic object associated with a first basic point or a first varying object associated with a first varying point in each of multiple display areas contained in a game field in a manner than a player can selected each of the objects; a player operation detection module configured to detect selection operation of the player selecting at least one of the first basic objects placed in the display areas or at least one of the first varying objects placed in the display areas at each of multiple turns; a conversion rate presentation module configured to present a conversion rate between the first basic points and the first varying points at each turn and at least a turn next to the turn to the player at each of the multiple turns; and an acquired point determination module configured to determine acquired points to be acquired by the player at each turn on the basis of the first basic point when the first basic object is selected by the selection operation and/or the first varying point when the first varying object is selected by the selection operation.

A game providing method according to an embodiment of the present invention is executed by a computer and includes: an object placement step of placing a first basic object associated with a first basic point or a first varying object associated with a first varying point in each of multiple display areas contained in a game field in a manner than a player can selected each of the objects;

a player operation detection step of detecting selection operation of the player selecting at least one of the first basic objects placed in the display areas or at least one of the first varying objects placed in the display areas at each of multiple turns;

a conversion rate presentation step of presenting a conversion rate between the first basic points and the first varying points at each turn and at least a turn next to the turn to the player at each of the multiple turns; and an acquired point determination step of determining acquired points to be acquired by the player at each turn on the basis of the first basic point when the first basic object is selected by the selection operation and/or the first varying point when the first varying object is selected by the selection operation.

Advantageous Effect of the Invention

According to various embodiments of the present invention, a puzzle game with an enhanced strategic characteristic is provided.

DETAILED DESCRIPTION OF THE INVENTION

Figure 1:
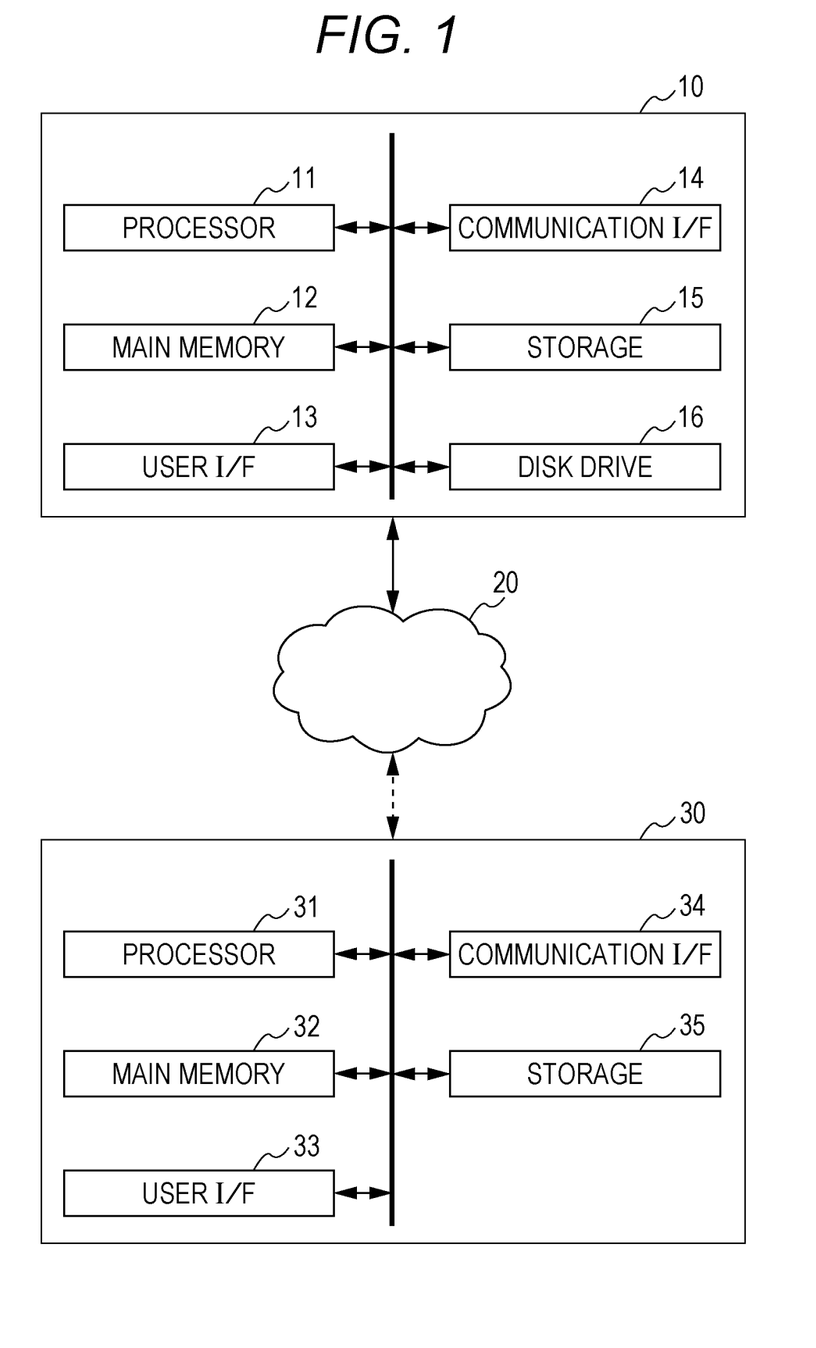
FIG. 1 is a block diagram schematically illustrating a network configuration of a system in which a program is executed according to an embodiment of the present invention.

FIG. 1 is a block diagram schematically illustrating a network configuration of a game providing system in which a program is executed according to an embodiment of the present invention. As illustrated in FIG. 1, the game providing system according to an embodiment of the present invention includes at least one of a server 10 and a terminal device 30. The server 10 is connected to and can communicate with the terminal device (client) 30 via a communication network 20 such as the Internet, and provides games to a player that operates the terminal device 30. Although one terminal device 30 is illustrated in FIG. 1, more than one terminal device 30 may be connected to and communicate with the server 10

As illustrated, the server 10 includes a processor 11, a main memory 12, a player I/F 13, a communication I/F 14, a storage 15, and a disk drive 16. These components are electrically connected to one another via a bus 17. The processor 11 loads an operating system and various programs for controlling progress of games onto the main memory 12 from the storage 15, and executes instructions contained in the loaded programs. The main memory 12 is used to store the programs to be executed by the processor 11. The main memory 12 is a DRAM, for example.

The player I/F 13 includes an information input device such as a keyboard and a mouse that receives operator input, and an information output device such as a liquid crystal display that outputs computation results from the processor 11, for example. The communication I/F 14 is implemented in hardware, firmware, or communication software such as a TCP/IP driver and a PPP driver, or a combination thereof, and can communicate with the terminal device 30 via the communication network 20.

The storage 15 is a magnetic disk drive, for example, and is configured to store various programs such as control programs for controlling progress of games, for example. The storage 15 may also store various data used in games. The data that can be stored in the storage 15 may alternatively be stored in a database server that is connected to and can communicate with the server 10 but is physically separate from the server 10. The disk drive 16 reads data stored in various storage media such as a CD-ROM, a DVD-ROM, and a DVD-R, and writes data thereinto. For example, data such as game applications and game data stored in storage media are read by the disk drive 16 and installed on the storage 15.

In one embodiment, the server 10 is a web server that manages a website including multiple web pages in a hierarchical structure, and can provide the terminal device 30 with game services. The terminal device 30 can acquire HTML data for displaying the web pages, analyze the acquired HTML data, and present the web pages to a player (a player of a game) of the terminal device 30. Games provided through such web pages are also referred to as browser games. The storage 15 also stores the HTML data for displaying the web pages. The HTML data are composed of HTML documents written in a markup language such as the HTML and associated with various images. The HTML data may also have embedded therein programs written in a scripting language or the like such as ActionScript or JavaScript (registered trademarks).

The storage 15 may also store game applications to be executed in an execution environment other than browser software in the terminal device 30. The game applications can contain game programs for executing games and various data such as image data referred to during execution of the game programs. The game programs are written in an object-oriented programming language such as Objective-C or Java (registered trademarks). The written game programs are stored together with various data in a form of application software into the storage 15. The application software stored in the storage 15 is delivered to the terminal device 30 in response to a delivery request. At the terminal device 30, the application software delivered from the server 10 is received via a communication I/F 34 under control of a processor 31, and the received game programs are sent to and stored in a storage 35. The application software is started according to player's operation of the terminal device 30, and executed on a platform such as NgCore (trademark) or Android (trademark) on the terminal device 30. The server 10 provides various data necessary for advancing a game to a game application running on the terminal device 30. The server 10 can also store various data transmitted from the terminal device 30 for each player to manage progress of games for each player.

The server 10 manages a website that provides a game service, and can thus advance a game by delivering web pages constituting the website in response to requests from the terminal device 30. The server 10 can also advance a game on the basis of communication with a game application running on the terminal device 30 alternatively to or in addition to such a browser game. The server 10 can store data necessary for advancing a game for each piece of identification information identifying each player in whichever manner the game is provided. Although details will not be described, the server 10 can also have functions of performing a process of authenticating a player at the start of a game and a billing process caused in the course of a game. The server 10 provides any games including action games, role playing games, real-time baseball games, card games, and puzzle games. The types of games realized by websites or game applications of the server 10 are not limited to those stated herein.

The terminal device 30 is any information processing device that displays web pages of a website for a game acquired from the server 10 on a web browser and has an application execution environment for executing game applications. Examples of the terminal device 30 include a mobile phone, a smart phone, a tablet terminal, a personal computer, an electronic book reader, and a game console, but the terminal device is not limited thereto.

As illustrated, the terminal device 30 includes the processor 31, a main memory 32, a player I/F 33, the communication I/F 34, and the storage 35. These components are electrically connected to one another via a bus 36.

The processor 31 loads various programs such as an operating system from the storage 35 onto the main memory 32, and executes instructions contained in the loaded programs. The main memory 32 is used to store the programs to be executed by the processor 31. The main memory 32 is a DRAM, for example.

The player I/F 33 includes an information input device that receives player input, and an information output device that outputs computation results from the processor 31, for example, including a display device such as a liquid crystal display with a touch panel.

The communication I/F 34 is implemented in hardware, firmware, or communication software such as a TCP/IP driver and a PPP driver, or a combination thereof, and can communicate with the server 10 via the communication network 20.

The storage 35 is a magnetic disk drive or flash memory, for example, and stores various programs such as an operating system. In receipt of a game application from the server 10 via the communication I/F 34, the storage 35 stores the received game application.

The terminal device 30 having such architecture is an example of a game providing device that provide games. The terminal device 30 includes browser software for interpreting files in the HTML format (HTML data) for screen display, for example. The functions of the browser software allow interpretation of HTML data acquired from the server 10 and display of web pages corresponding to the received HTML data. The terminal device 30 also includes plug-in software (such as Flash Player provided by Adobe Systems Incorporated) embedded in the browser software, capable of acquiring files in the SWF format embedded in HTML data from the server 10 and executing the files in the SWF format by using the browser software and the plug-in software. In the terminal device 30, a game application is started according to player's operation and executed on a platform on the terminal device 30.

When a game is executed in the terminal device 30, an animation or an icon for operation, for example, instructed by a program is displayed on a screen of the terminal device 30. The player can input instructions for advancing the game by using an input interface of the terminal device 30. Instructions input by the player are transferred to the server 10 through the functions of a browser and a platform such as NgCore (trademark) of the terminal device 30.

Figure 2:
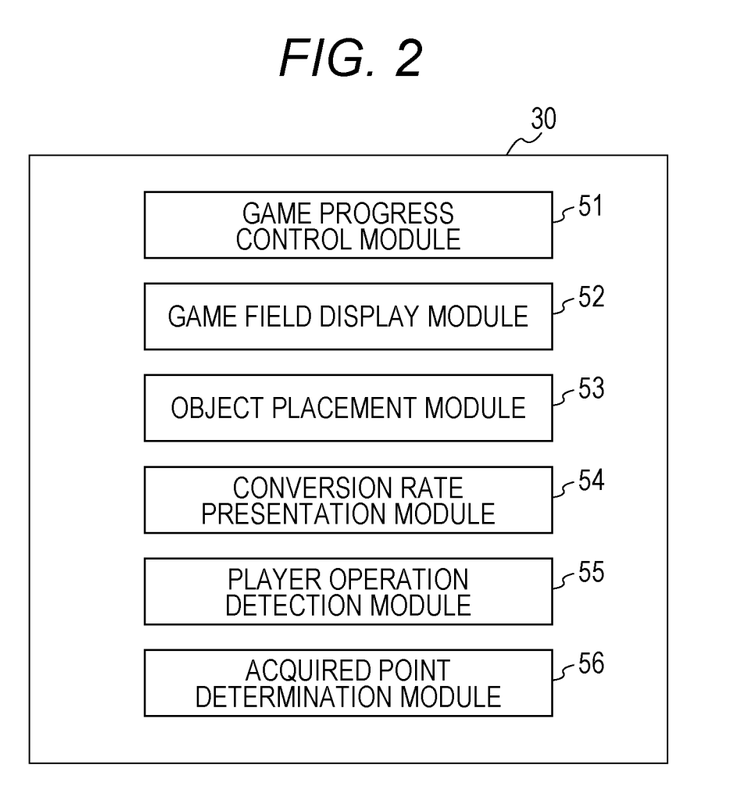
FIG. 2 is a block diagram illustrating functions of a program according to an embodiment of the present invention.

Next, functions of the terminal device 30 will be described with reference to FIG. 2. The respective functions of the terminal device 30 are realized by various modules executed by the processor 31. As illustrated in FIG. 2, the modules executed by the processor 31 include a game process control module 51 for controlling a progress of a game, a game field display module 52 for displaying a game field on a display, and an object placement module 53 for displaying an object in each of multiple display areas contained in the game field. As will be described later, objects according to an embodiment of the present invention at least include basic objects and varying objects.

The modules executed by the processor 31 further includes a conversion rate presentation module 54 for presenting a conversion rate at which a basic point associated with a basic object is exchanged to a varying point associated with a varying object to the player, a player operation detection module 55 for detecting player's operation of selecting objects, and an acquired point determination module 56 for determining a point to be acquired by the player on the basis of the selection operation. The basic object and the basic point, and the varying object and the varying point will be described later.

The modules illustrated in FIG. 2 are exemplary only. The terminal device 30 may execute modules other than those illustrated or may not execute some of the illustrated modules. Furthermore, some or all of the modules illustrated in FIG. 2 may be executed by a processor included in a device other than the terminal device 30 (the processor 11 of the server 10, for example) or a processor included in another terminal device. When some or all of the modules illustrated in FIG. 2 are executed by a processor in a device other than the terminal device 30, the terminal device 30 can provide a game by receiving a processing result from the external processor and displaying a game screen on the basis of the processing result.

In one embodiment, all or some of programs for realizing the modules of FIG. 2 may be provided to the terminal device 30 in a form embedded in HTML documents from the server 10. In another embodiment, all or some of the modules of FIG. 2 may be provided in a form of game applications.

In one embodiment of the present invention, a puzzle game is provided by executing the modules by one or more processors such as the processor 31. The puzzle game is configured to place an object in each of multiple display areas contained in a game field and allow a player to acquire a point according to the kind and the number of objects selected by the player, for example. The objects include at least two kinds of objects, which are basic objects and varying objects as mentioned above. A basic object is associated with a basic point, and a varying object is associated with a varying point. In a puzzle game according to an embodiment of the present invention, an exchange rate between a varying point and a basic point is defined, and a varying point is defined on the basis of the basic point and the exchange rate.

A puzzle game according to an embodiment of the present invention is configured to end after a predetermined number of turns and contest the total acquired point at the end. For example, in each turn, player's selection operation is detected and a point acquired by the player on the basis of the selection operation is calculated. When the acquired point is calculated in each turn, the game proceeds to the next turn. This is repeated the predetermined number of turns (ten turns, for example), and the total acquired point after the predetermined number of turns (an accumulation of acquired points in the respective turns) is contested. In one embodiment, the acquired point after the predetermined number of turns is calculated for each player by the server 10, and the result of the calculating is presented as a ranking. In this manner, players are motivated to maximize the acquired points after the predetermined number of turns. Such a game rule affects the game characteristic (strategic characteristic) of a puzzle game according to an embodiment of the present invention. While a puzzle game according to an embodiment of the present invention is to contest the total acquired points during multiple turns, a ranking need not necessarily be calculated to show superiority or inferiority to other players. In other words, as a result of presenting the total of acquired points in the predetermined number of turns to a player, the player is motivated to maximize the acquired points even if acquired points of other players are unknown.

Hereinafter, the functions of the modules of FIG. 2 will be further described. The game process control module 51 transmits/receives various data necessary for advancing a game provided by the server 10 to/from the server 10 where necessary to control the progress of the game. For example, the game process control module 51 sequentially acquires various web pages necessary for advancing the game and displays the web pages on a display 33a of the terminal device 30. Since the web pages stored in the server 10 are sequentially displayed on the display of the terminal device 30 in this manner, the player can advance the game on the basis of the player's operation through the functions of the game process control module 51.

For executing a program provided in a form of a game application in the terminal device 30, the game process control module 51 is executed on a predetermined application platform to transmit/receive information relating to advancement of the game to/from the server 10. For example, when a predetermined stage is completed in a game being played, the game can be advanced by transmitting the point acquired during the stage to the server 10, acquiring various data relating to a stage next to the completed stage from the server 10, and loading the acquired data.

The game process control module 51 can transmit information relating to advancement of a game such as information indicating various parameter values (such as information on acquired game points and acquired items) used in the game and information indicating the status (such as information identifying completed stages) to the server 10 as appropriate by using the functions of browser software and a game application. The server 10 can store information relating to advancement of the game received from multiple terminal devices 30 for each player to control advancement of the game for each player. As a result, when a player logs in to the server 10 by using his/her ID, the server 10 can resume the game from a stage corresponding to the progress of the player on the basis of the information relating to advancement of the game held in association with the player.

Figure 3:
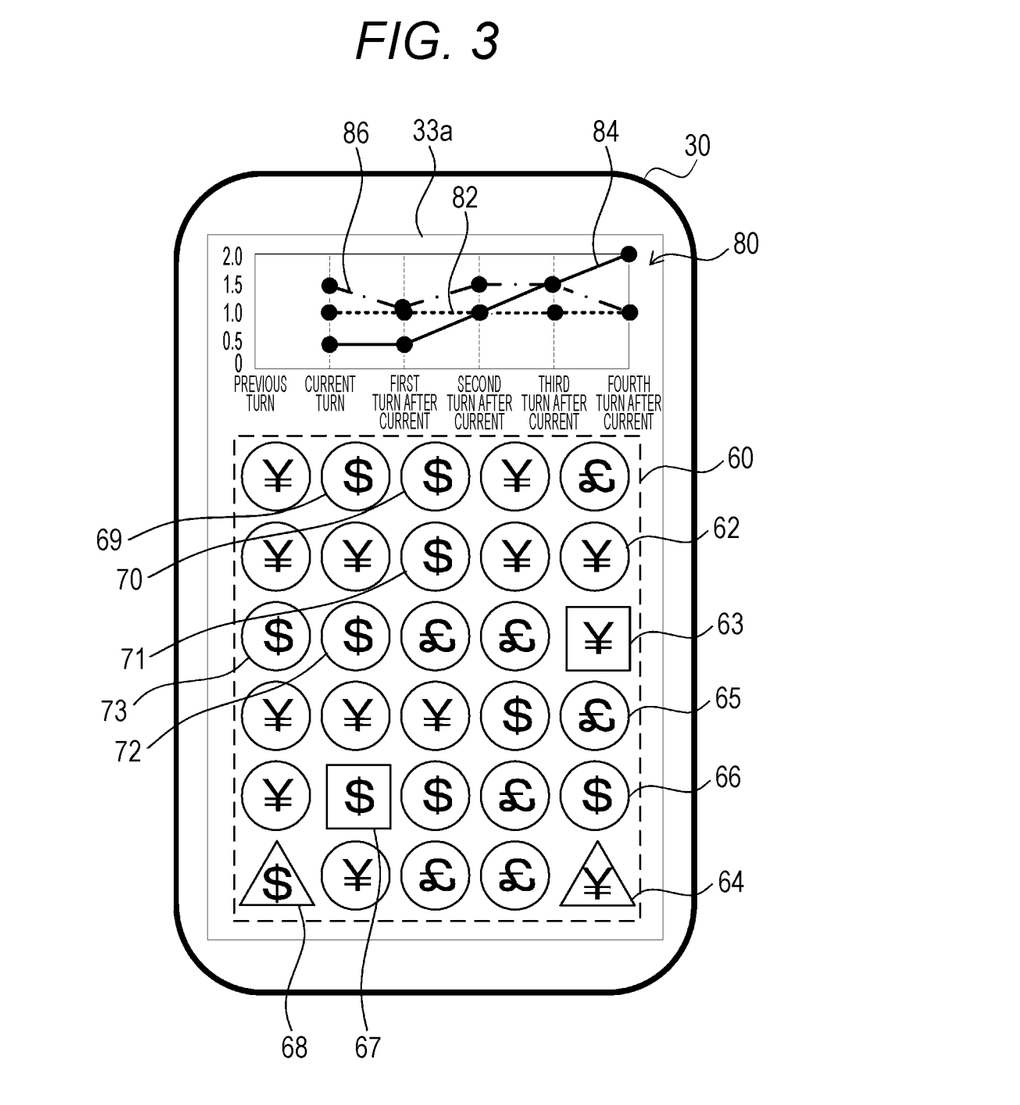
FIG. 3 is an explanatory diagram illustrating an example of a game screen according to an embodiment of the present invention.

When a puzzle game provided in the terminal device 30 is executed, the game field display module 52 is configured to display a game field used in the puzzle game on the display 33a of the terminal device 30. FIG. 3 illustrates an example of a display screen displayed on the display 33a of the terminal device 30. In one embodiment, the display 33a may be a touch panel display. The display screen of FIG. 3 illustrates an example of a game screen displayed on the terminal device 30 at the first turn in executing a puzzle game according to an embodiment. The display screen is displayed on the terminal device 30 as a result of a display request for playing the puzzle game from the player operating the terminal device 30 to the server 10 or executing an application of the puzzle game in the terminal device 30.

In the display screen illustrated in FIG. 3, a game field 60 is arranged in a lower area and a conversion rate field 80 to be described later is arranged in an upper area. In the example of FIG. 3, 30 display areas in a grid-like arrangement of six rows and five columns are contained in the game field 60, and an object is displayed in each of the display areas.

The object placement module 53 is configured to place an object in each of the display areas contained in the game field 60. Herein, an object refers to an object of selection or an object of operation by the user displayed on the game screen. In the example of FIG. 3, figures of circles, squares and triangles containing "¥", "$" or "£" therein are examples of the object. Specifically, in the game field 60 of FIG. 3, three kinds of objects, which are objects (hereinafter referred to as "yen objects") that are circles, squares or triangles containing "¥" therein, objects (hereinafter referred to as "dollar objects" that are circles, squares or triangles containing "$" therein, and objects (hereinafter referred to as "pound objects") that are circles containing "£" therein, are arranged. Although not illustrated in FIG. 3, pound objects that are squares or triangles may also be arranged in the display areas in the game field 60.

As described above, the game field in FIG. 3 contains 30 display areas in each of which any one of the three kinds of objects is placed under the control of the object placement module 53. Note that some of reference numerals for some objects are not stated in FIG. 3 since many objects are illustrated.

As described above, the objects according to an embodiment of the present invention include at least basic objects and varying objects. In the example illustrated in FIG. 3, yen objects 62 are basic objects associated with a basic point and dollar objects 66 and pound objects 65 are varying objects associated with varying points. Objects other than the yen objects 62 may be defined as basic objects. For example, the dollar objects 66 or the pound objects 66 may be defined as basic objects and the yen objects 62 may be defined as varying objects. Although three kinds of objects are illustrated in FIG. 3, objects according to the present invention may be classified into two kinds (yen objects and dollar objects, for example) or into four or more kinds.

As will be illustrated later, in the present embodiment, the player of the puzzle game can select objects displayed on the game screen to acquire a point associated with the kind and the number of selected objects. Each object is associated with a basic point or a varying point based on the kind thereof. When objects are selected by the player, an acquired point is calculated on the basis of the points associated with the selected objects and the number of selected objects.

In some embodiments of the present invention, the same kind of objects are classified into different ranks. In addition, different points are associated to objects of different ranks even when the objects are of the same kind. For example, on the game screen of FIG. 3, the kinds of objects are expressed by symbols "¥," "$" and "£" expressing currencies, and the ranks of the respective objects are distinguished by the shapes (circles, squares and triangles) of the figures containing the currencies therein. For example, the objects in circles are of the lowest rank, objects in squares are of the intermediate rank, and the objects in triangles are of the highest rank. In the example of FIG. 3, the yen objects 62 in circles are classified as the lowest rank and associated with the lowest basic point ("100 points," for example). The yen objects 63 in squares are classified as the intermediate rank and associated with an intermediate basic point ("1000 points," for example). In addition, the yen objects 64 in triangles are classified as the highest rank and associated with the highest basic point ("10000 points," for example). Similarly, the dollar objects and the pound objects may also be classified into three ranks. The manner of rank classification that can be applied to the present invention is not limited to that described above. For example, one kind of objects may be classified into four or more ranks and the objects of the respective ranks may be associated with different points.

The conversion rate presentation module 54 presents a conversion rate (may also be referred to as a yen-dollar exchange rate) between basic points associated with yen objects that are basic objects and varying points associated with dollar objects that are a kind of varying objects to the player. In one embodiment, the conversion rate presentation module 54 can also present a conversion rate (may also be referred to as a yen-pound exchange rate) between the basic points and varying points associated with pound objects that are a kind of varying objects to the player.

A graph and numerals indicating the conversion rate are displayed on the display 33a as part of the game screen, for example. The conversion rate presentation module 54 can present conversion rates at several subsequent turns in addition to the conversion rate at the current turn to the player. For example, the conversion rate in the example of FIG. 3 is expressed in a form of a graph in a conversion rate field 80 in the display screen. The horizontal axis of the graph represents the turn of the game, and conversion rates (yen-dollar exchange rates and yen-pound exchange rates) between basic points and varying points at respective turns from a turn (represented by "PREVIOUS TURN") that is one turn before the current turn (represented by "CURRENT TURN") to the fourth turn after the current turn. In the example of FIG. 3, the yen-dollar exchange rate and the yen-pound exchange rate can have values ranging from "0" to "2.0" at intervals of 0.5.

In the present invention, the possible range of the exchange rates is not limited to 0 to 2.0 mentioned above, but any ranges may be applied. The intervals for adjustment are not limited to the intervals of "0.5" but may be set to any intervals. Furthermore, specific methods for presenting the exchange rates to the player are not limited to that described above. For example, the exchange rates may be displayed on the display 33*a* as a screen separate from the game screen, or may be displayed on a certain display device other than the display 33*a*. Alternatively, the exchange rates may be presented to the player by using senses other than the visual sense such as voice reading or tactile communication.

In one embodiment of the present invention, the varying points associated with the dollar objects are calculated by multiplying the basic points associated with the yen objects by the yen-dollar conversion rate. The conversion rates may be calculated according to a predetermined algorithm (randomly by using pseudo random numbers, for example) at each turn or may be predetermined before the start of the game. When the conversion rates are calculated at each turn, the varying points are calculated on the basis of the calculated conversion rates and the basic points. The varying points of the dollar objects thus calculated are stored in a format that can be referred to in calculation of acquired points to be described later and in association with the dollar objects. Similar processing is performed for varying points of the pound objects.

As described above, in one embodiment, objects of the same kind are classified into different ranks. Varying points of varying objects are calculated by multiplying the basic points associated with yen objects of the same rank as the varying objects by an exchange rate. For example, the varying points of dollar objects classified as the lowest rank are calculated by multiplying basic points associated with yen objects also classified as the lowest rank out of the basic objects (yen objects) by the conversion rate between the yen objects and the dollar objects. For example, when the basic points of the lowest rank are 100 points and the conversion rate between the basic objects and the dollar objects is "1.5," the varying points associated with the dollar objects of the lowest rank are "150 points" resulting from multiplying "100" by "1.5." Similarly, when the basic points of the highest rank are 10000 points and the conversion rate between the basic objects and the dollar objects is "1.5," the varying points associated with the dollar objects of the highest rank is "15000" resulting from multiplying "10000" by "1.5." Varying points of varying objects classified as the ranks other than these ranks are also determined similarly. Varying points associated with pound objects 65 are also determined similarly.

In the embodiment illustrated in FIG. 3, the player of the puzzle game can look at the display screen illustrated in FIG. 3 and select objects displayed in the game field 60 according to a predetermined rule. When the display 33*a* is a touch panel, objects can be selected by dragging or tapping the positions where the objects to be selected are displayed on the surface of the display 33*a*. Similarly to puzzle games of the related art, the player can select the same kind of objects successively in a traversable manner by dragging operation, for example. Such selection operation of the player is detected by the player operation detection module 55 in an embodiment of the present invention.

Figure 4:
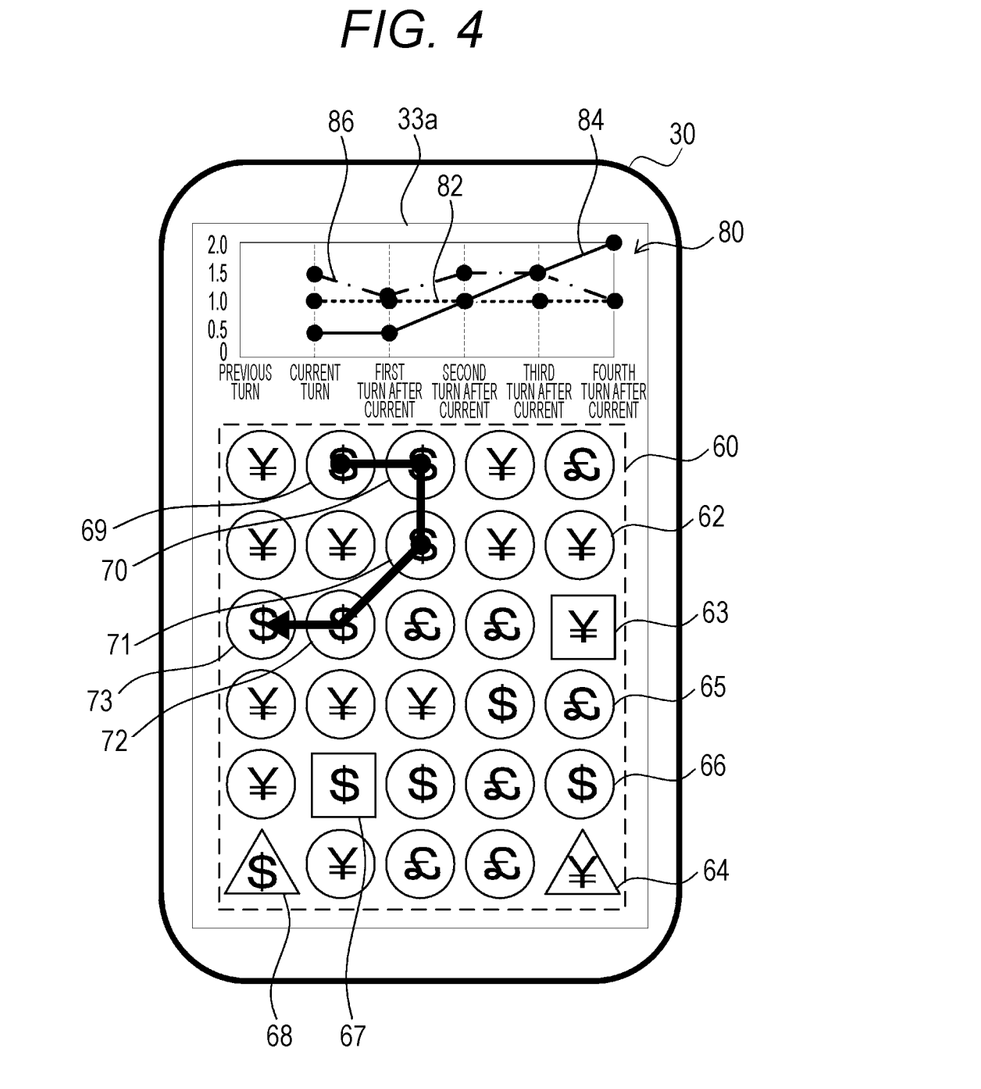
FIG. 4 is an explanatory diagram illustrating an example of a game screen according to an embodiment of the present invention.
Figure 5:
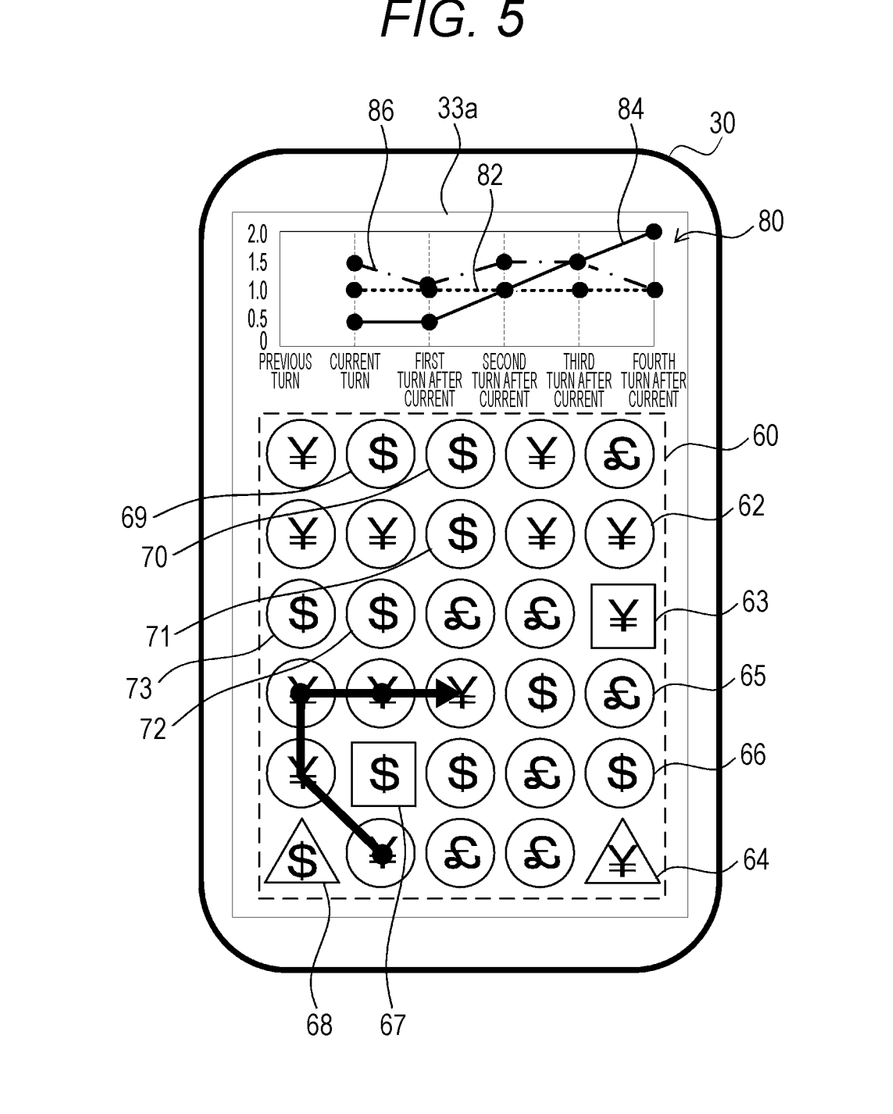
FIG. 5 is an explanatory diagram illustrating an example of a game screen according to an embodiment of the present invention.

Selection of objects will be further described with reference to FIG. 3. As illustrated in FIG. 3, in the object field 60, a dollar object 69 and a dollar object 70, the dollar object 70 and a dollar object 71, the dollar objects 71 and a dollar object 72, and the dollar objects 72 and a dollar object 73 are arranged adjacent to each other. In this case, the player can successively select five dollar objects in the order of dollar objects 69, 70, 71, 72, and 73 as indicated by a thick virtual arrow in FIG. 4. In this case, the player operation detection module 55 can detect the successive selection of the dollar objects 69, 70, 71, 72, and 73. Similarly to the dollar objects, yen objects or pound objects arranged adjacent to one another in the game field 60 can also be selected successively. FIG. 5 illustrates that five yen objects can be selected successively in the object arrangement in FIG. 3.

Figure 6:
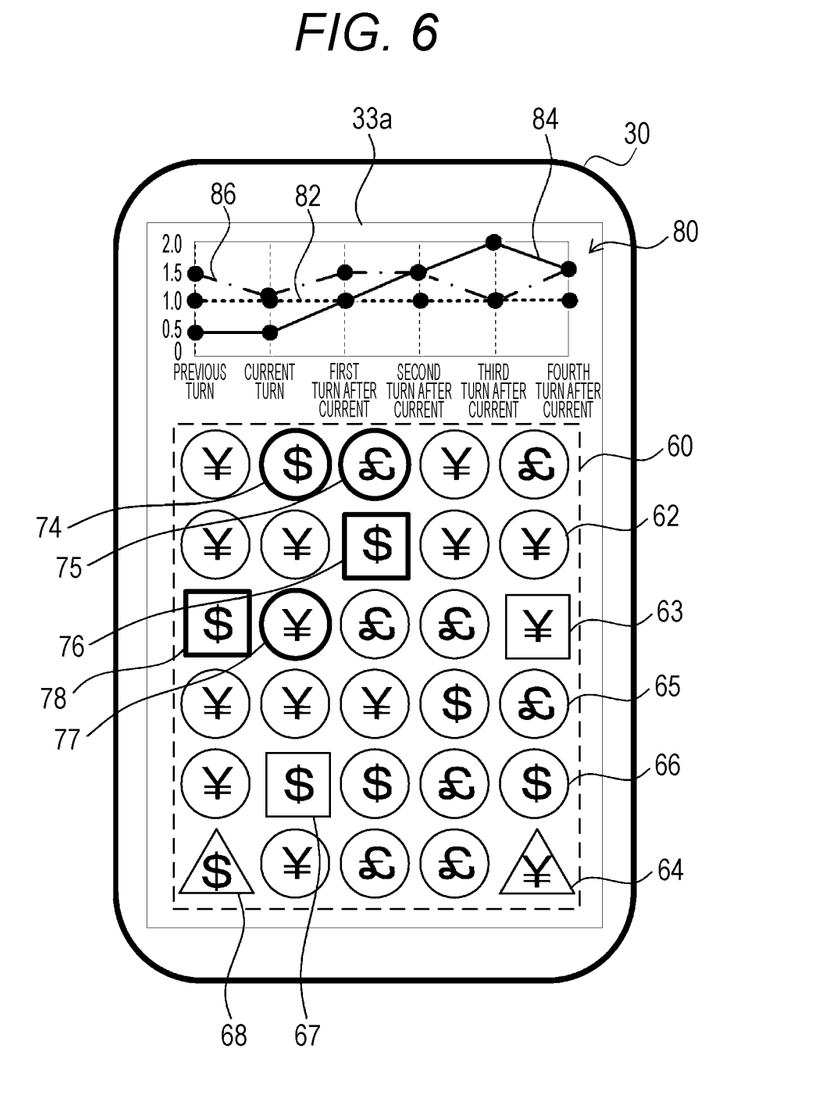
FIG. 6 is an explanatory diagram illustrating an example of a game screen according to an embodiment of the present invention.

The objects selected by the player's selection operation are deleted from the object field 60 after completion of the selection operation. The selection operation is determined to be completed when a finger used for the operation is off from the display 33*a* after dragging a given zone of the display 33*a*, for example. Other objects are in the display areas where the deleted objects had been placed according to a predetermined placement rule at the next turn. FIG. 6 illustrates an example display of a game screen at a turn next to the turn when five dollar objects 69 to 73 are selected at the turn illustrated in FIG. 4. In the object field 60 of FIG. 6, new objects 74 to 78 are arranged in the display areas where the dollar objects 69 to 73 had been placed in the previous turn in place of the dollar objects 69 to 73, respectively. In the object field 60 at the turn of FIG. 6, objects other than the objects 74 to 78 are unchanged from those placed in the previous turn.

In the embodiments of the present invention, various rules can bused as the placement rule of new objects in place of objects deleted as a result of player's selection. For example, in one embodiment, when five or more objects of the same kind are successively selected, two objects of the same kind as but of a higher rank than the selected objects and three objects of the lowest rank (which may be of the same kind as or of a different kind from the selected objects) are displayed as new objects by which the five selected objects are replaced in the game field 60 in place of the deleted objects. Since five dollar objects of the lowest rank are successively selected in the example of FIG. 4, dollar objects 76 and 78 of the intermediate rank that is one rank higher than the selected dollar objects 69 to 73 are placed in two of the display areas where the selected dollar objects 69 to 73 had been placed, and a dollar object 74, a pound object 75, and a yen object 77 of the lowest rank are placed in the rest of the display areas at the next turn in FIG. 6. The placement rule for placing new objects that can be applied to the present invention is not limited to that described above, but various placement rules can be employed to enhance the strategic characteristic of games in the present invention.

The acquired point determination module 56 calculates acquired points acquired by the user through selection operation according to the player's selection operation detected by the player operation detection module 55 according to a predetermined calculation logic. In one embodiment of the present invention, the calculation of acquired points is based on the points (basic points or varying points) associated with the objects selected by the player and the number of selected objects. For example, as illustrated in FIG. 5, when five yen objects that are basic objects of the lowest rank are selected, the acquired points are calculated on the basis of the basic points (100 points) and the number of selected objects ("5" in this case). In the example of FIG. 5, since five yen objects (basic objects) are successively selected, 500 points obtained by multiplying the basic points "100 points" by the number "5" of successively selected objects are the acquired points. The calculation logic for obtaining the acquired points that can be applied to the present invention is not limited to that described above, but various calculation logics can be applied to the present invention. For example, the acquired points when basic objects are selected may be defined to increase as the number of successively selected basic objects increases. Conversely, the acquired points may be defined to be always the basic points even if the number of successively selected basic objects increases.

An example of a method of calculating acquired points when varying objects are selected will be described. As illustrated in FIG. 4, when dollar objects that are varying objects are selected, the acquired points of the player are calculated on the basis of the varying points associated with the dollar objects. As described above, the varying objects associated with the dollar objects are calculated by multiplying the basic points by the yen-dollar conversion rate, for example. Since the yen-dollar conversion rate at the turn illustrated in FIG. 4 is "0.5" as indicated in the conversion rate field 80 in FIG. 4, the varying points associated with the dollar objects are 50 points. The acquired point determination module 56 calculates the acquired points to be acquired by the player on the basis of the varying points. For example, in the example of FIG. 4, since five dollar objects are selected, 250 points obtained by multiplying the varying points "50 points" associated with the dollar objects by the number "5" of successively selected objects are the acquired points to be acquired by the player. The calculation logic for obtaining the acquired points based on the varying points that can be applied to the present invention is not limited to that described above, but various calculation logic can be applied to the present invention.

In one embodiment of the present invention, objects classified as different ranks can successively selected as long as the objects are of the same kind. Specifically, the player operation detection module 55 can detect selection operation of objects classified as different ranks but of the same kind as effective selection operation. For example, at the turn illustrated in FIG. 4, a yen object 63 of the intermediate rank and a yen object 62 of the lowest rank arranged above and adjacent to the yen object 62 can be selected. When objects of different ranks are selected in this manner, acquired points are calculated on the basis of basic points or varying points of the respective ranks. For example, when the yen object 62 and the yen object 63 are selected in the example illustrated in FIG. 4, the acquired points are calculated on the basis of the basic points (100 points, for example) of the lowest rank associated with the yen object 62 and the basic points (1000 points, for example) of the intermediate rank associated with the yen object 63. For example, 1100 points obtained by adding the basic points "100 points" of the lowest rank and the basic points "1000 points" of the intermediate rank are calculated as the acquired points. Furthermore, when objects of different ranks are selected, the acquired points can be calculated taking the number of selected objects of each rank into consideration in addition to the basic points or the varying points of each rank. For example, when one basic object of the lowest rank and two basic objects of the intermediate rank are selected, "2100 points" obtained by adding "2000 points" obtained by multiplying the basic points "1000 points" of the intermediate rank by the number "2" of the selected basic objects of the intermediate rank to the basic points "100 points" of the lowest rank are calculated as the acquired points.

The acquired point determination module 56 can calculate the total of acquired points acquired at respective turns from the start of the game in addition to calculation of the acquired points at each turn described above. The total of the acquired points added up from the start of the game may be displayed on the display 33a as part of the game screen.

Figure 7:
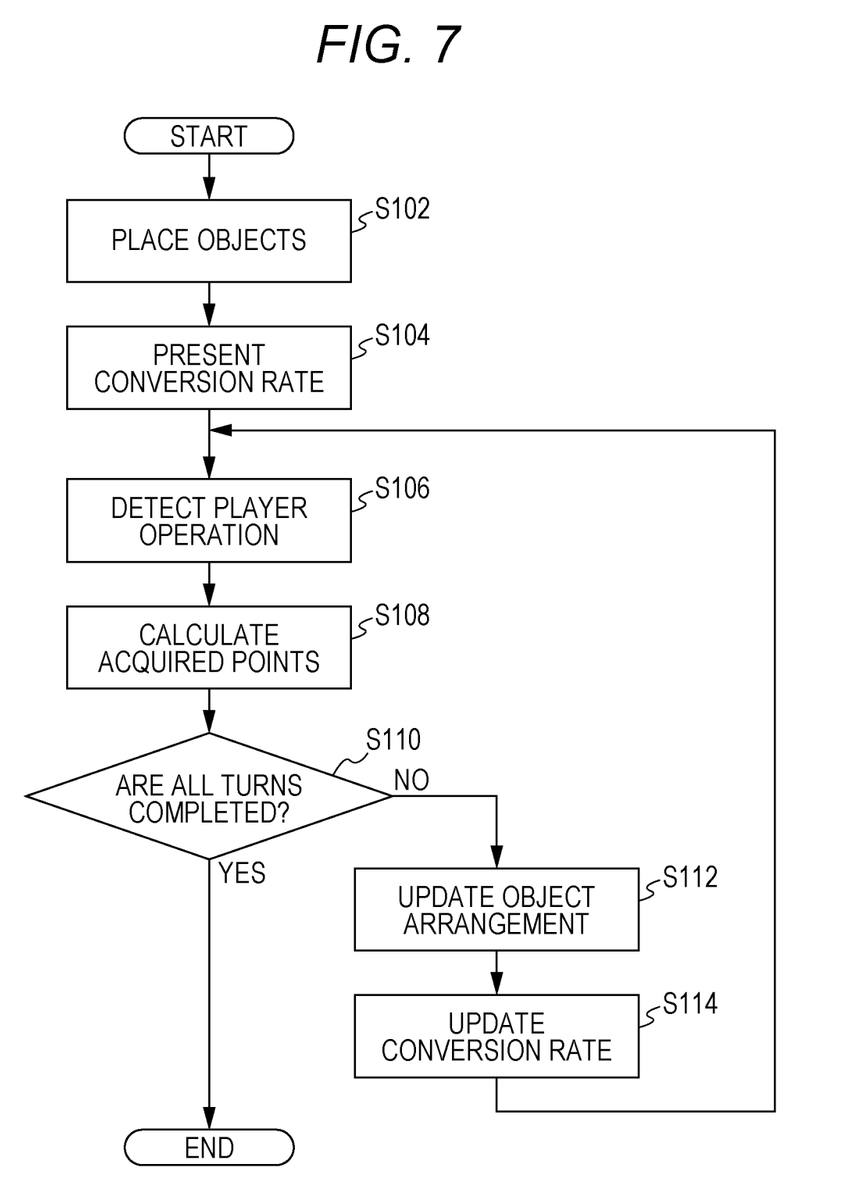
FIG. 7 is a flowchart illustrating a flow of processing from the start to the end of a game according to an embodiment of the present invention.

Next, a flow of processing according to an embodiment of the present invention will be described with reference to FIG. 7. FIG. 7 is a flowchart illustrating an example of a flow of processing from the start of the puzzle game to the end thereof through predetermined number of turns according to an embodiment of the present invention.

When the puzzle game is started, first in step S102, objects are placed as illustrated in FIG. 3, for example, in respective display areas in the object field 60, and the object field 60 in which the objects are arranged is presented to the player. The processing in step S102 is mainly executed by the game field display module 52 and the object placement module 53.

Subsequently, in step S104, conversion rates between basic points associated with basic objects (yen objects) and varying points associated with varying objects (dollar objects and pound objects) are displayed in the conversion rate field 80 in the game screen as illustrated in FIG. 3. In one embodiment, the conversion rates at five turns including the first turn at the start of the game are displayed in the conversion rate field 80. The processing in step S104 is mainly executed by the conversion rate presentation module 54, for example. Note that step S102 and step S104 may be executed at the same time or the processing in step S104 may be executed before the processing in step S102.

After the processing in step S104 is completed, the game screen as illustrated in FIG. 3 is displayed on the display 33a of the terminal device 30. On the game screen, thirty objects are displayed in the object field 60 and yen-dollar conversion rates and yen-pound conversion rates at respective turns from the current turn to the fourth turn from the current turn are displayed in the conversion rate field 80. The player facing the game screen can develop a strategy to maximize the acquired points until the end of the game by referring to the object arrangement in the object field 60 and the current and future conversion rates displayed in the field 80.

Figure 8:
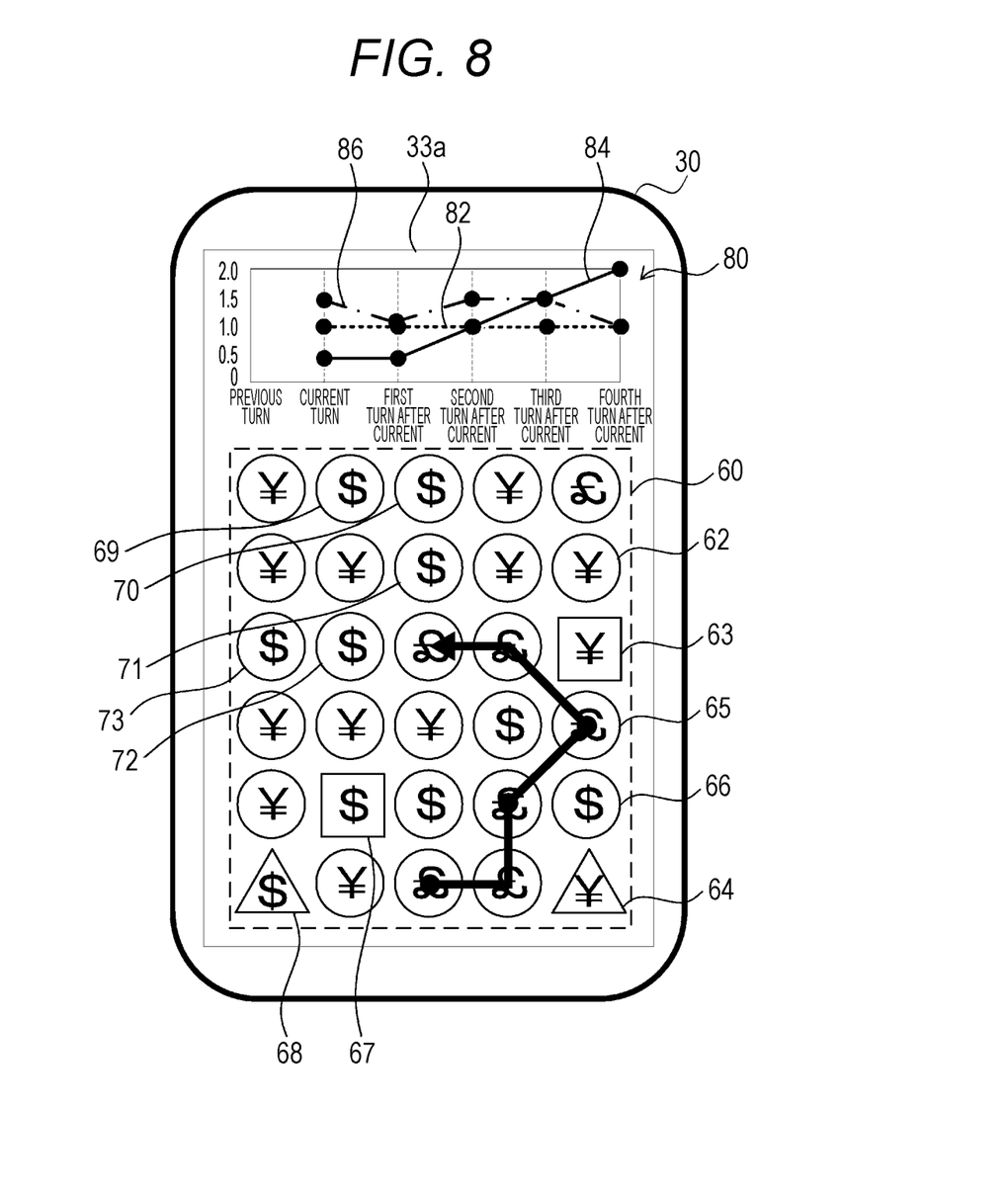
FIG. 8 is an explanatory diagram illustrating an example of a game screen according to an embodiment of the present invention.

Possible strategies that can be taken by the player at this point can be broadly classified into two. One strategy is to focus on the conversion rates at the current turn to maximize the acquired points that can be acquired at the current turn. In the example of FIG. 3, the conversion rates at the current turn are the conversion rate of dollar objects to yen objects "0.5" and the conversion rate of pound objects to yen objects "1.5." Thus, if the other conditions are the same, the points acquired by selecting the pound objects are larger than those acquired by selecting the other objects. The player that adopts the strategy of maximizing the acquired points at the current turn to maximize the total acquired points through all the turns therefore selects pound objects at the current turn as illustrated in FIG. 8.

The other strategy is to focus on the conversion rate at some turns later displayed in the conversion rate field 80 to attempt to acquire more points at the future turn. In the example of FIG. 3, it is shown that the conversion rate for the dollar objects rises to the highest value of "2.0" at the fourth turns from the current. Thus, it is conceivable to select dollar objects of low ranks at the current turn as illustrated in FIG. 4, for example, so that many dollar objects of high ranks can be selected at the fourth turn from the current turn. As described above, when a predetermined number or more objects classified as low ranks are successively selected, objects of the same kind classified as higher ranks will be displayed in the game field 60. It is thus an effective strategy for the player to daringly select the dollar objects even if the yen-dollar exchange rate at the current turn is disadvantageous in an attempt to acquire more points in the future turn. In this manner, selection of objects at a low conversion rate at the current turn may be an effective strategy for maximizing the total acquired points after completing all the turns.

As described above, in the present embodiment, since the exchange rates between the basic objects and the varying objects at the future turns are also presented in the conversion rate field 80, the player need to develop the strategy taking the change in the conversion rates in the future in addition to simply examining the manner in which objects are selected at the current turn in order to maximize the total acquired points at the end of the game. The strategic characteristic of the game is therefore significantly improved as compared to puzzle games of the related art.

The player determines which objects in the game field 60 to select on the basis of his/her strategy. Referring back to the flowchart of FIG. 7, in step S106, the player can select desired objects by tapping or other operation from the objects displayed in the game field 60. The objects selected by the player are detected mainly by the player operation detection module 55.

When selection of objects by the player is detected, the processing proceeds to step S108 in which the acquired points at the current turn are calculated. The acquired points at the current turn are calculated on the basis of the basic points, the ranks, and/or the conversion rates as described above. Furthermore, the acquired points at the current turn are added up with the acquired points at the previous turn and turns prior thereto to calculate the total acquired points of the completed turns.

After the selection of objects by the player is completed and the calculation of the acquired points is completed in this manner at the current turn, the processing proceeds to step S110 in which it is determined whether or not all of the predetermined turns are completed. If all the turns are not completed, the processing proceeds to step S112 in which the objects placed in the object field 60 are updated as illustrated in FIG. 6, for example. The update of the objects is executed mainly by the object placement module 53. Subsequently, in step S114, the conversion rates displayed in the conversion rate field 80 are updated as illustrated in FIG. 6, for example. The update of the conversion rates is executed mainly by the conversion rate presentation module 54.

When the objects and the conversion rates are updated in this manner, the display screen containing the object field 60 containing the updated objects and the conversion rate field 80 containing the updated conversion rates is displayed on the display 33a. The processing then proceeds again to step S106 in which player's selection operation on the game screen containing the updated objects and conversion rates is accepted.

The processing in steps S106 to S114 is repeated until it is determined in step S110 that all the turns are completed. If it is determined in step S110 that all the turns are completed, the puzzle game in the present embodiment is terminated.

Although the embodiments of the present invention have been described herein by referring to examples in which the respective modules in FIG. 2 are executed in the terminal device 30, the modules in FIG. 2 may be executed by a processor included in a device other than the terminal device 30 (the processor 11 of the server 10, for example) or a processor included in another terminal device as described above. Thus, a set of information processing devices each including a processor that executes at least some of the modules illustrated in FIG. 2 constitutes a game providing system according to the present invention. For example, when the functions of the modules in FIG. 2 are distributed to and processed by the terminal device 30 and the server 10, a system constituted by the terminal device 30 and the server 10 can be an embodiment of a game providing system of the present invention.

Even if processing and procedures described herein are explained to be implemented by a single device, software element, component, or module, such processing and procedures can be implemented by multiple devices, software elements, components and/or modules. Furthermore, even if data, tables, and databases described herein are explained to be stored in a single memory, such data, tables, and databases can be distributed and stored in multiple memories included in a single device or distributed in multiple devices. Moreover, software and hardware elements described herein may be integrated into a smaller number of elements or divided into a larger number of elements.

Even if a component of the invention is described in either of a singular form and a plural form or in a form not defined whether it is singular or plural, the component may be either in a singular form or in a plural form unless the context requires otherwise.

With respect to the processing procedures, in particular the processing procedures described with reference to the flowchart herein, some steps of the processing procedures may be omitted, steps that are not explicitly stated as the steps of the processing procedures may be added, and/or the order in which the steps are performed may be changed. Such omission, addition, and change in order are also within the scope of the present invention without departing from the gist of the present invention.

What is claimed is:

1. A game providing system comprising:
    a terminal device configured to be communicatively coupled to a server, the terminal device and the server each comprising hardware that interact with each other to be configured to:
    place a first basic object associated with a first basic point or a first varying object associated with a first varying point in each of multiple display areas of the terminal device, the multiple display areas contained in a game field on a display of the terminal device, in a manner such that a player can provide an input to the terminal device to select each of the objects;
    detect, by the terminal device, a selection operation of the player using the terminal device, by the player selecting at least one of the first basic objects placed in the display areas of the terminal or at least one of the first varying objects placed in the display areas at each of multiple turns;
    generate as an output a conversion rate between the first basic points and the first varying points at each turn and at least a turn next to the turn as an output, and present the output to the player via the display of the terminal device at each of the multiple turns; and
    determine acquired points to be acquired by the player at each turn on the basis of the first basic point when the first basic object is selected by the selection operation and/or the first varying point when the first varying object is selected by the player by providing an input to an interface of the terminal device in the selection operation, wherein the first varying point at each of the multiple turns is calculated on the basis of the first basic point and the conversion rate at the turn.

2. The game providing system according to claim 1, wherein the hardware that interact with each other are configured to update the conversion rates.

3. The game providing system according to claim 1, wherein when a predetermined number or more first basic objects are successively selected by the player, the hardware that interact with each other generate an output to the terminal device that comprises a second basic object associated with a second basic point larger than the first basic point in at least one of display areas, as output on the terminal device of the player, in which the first basic objects are placed.

4. The game providing system according to claim 3, wherein when a predetermined number or more first varying objects are successively selected by the player, the hardware that interact with each other are configured to generate an output comprising a second varying object associated with a second varying point to the display of the terminal device for at least one of display areas of the display, in which the first varying objects are placed, the second varying point being defined on the basis of the first basic point and the conversion rate.

5. The game providing system according to claim 4, wherein when the second varying object is selected by the selection operation at each of the turns, the hardware that interact with each other are configured to determine the acquired points to be acquired by the player on the basis of the second varying point.

6. The game providing system according to claim 4, wherein hardware that interact with each other are configured to detect selection operation of selecting the first varying object and the second varying object.

7. The game providing system according to claim 6, wherein when the first basic object and the second basic object are selected by the selection operation at each of the turns, the hardware that interact with each other are configured to determine the acquired points to be acquired by the player on the basis of the first basic point and the second basic point.

8. The game providing system according to claim 7, wherein the hardware that interact with each other are configured to determine the acquired point further on the basis of the number of the first basic objects and the number of second basic objects selected by the selection operation at each of the turns.

9. The game providing system according to claim 6, wherein when the first varying object and the second varying object are selected by the selection operation at each of the turns, the hardware that interact with each other are configured to determine the acquired point to be acquired by the player on the basis of the first varying point and the second varying point.

10. The game providing system according to claim 8, wherein the hardware that interact with each other are configured to determine the acquired point further on the basis of the number of the first varying objects and the number of second varying objects selected by the selection operation at each of the turns.

11. The game providing system according to claim 3, wherein when the second basic object is selected by the selection operation at each of the turns, the hardware that interact with each other are configured to determine the acquired points to be acquired by the player on the basis of the second basic point.

12. The game providing system according to claim 3, wherein the hardware that interact with each other are configured to detect selection operation of selecting the first basic object and the second basic object.

13. The game providing system according to claim 1, wherein the hardware that interact with each other are configured to display the conversion rates in the same screen as the game field, which is generated as an output to the display of the terminal device.

14. The game providing system according to claim 1, wherein the hardware that interact with each other are configured to add up acquired points at the respective turns to calculate a total acquires point.

15. A non-transitory computer-readable storage medium storing a game program with instructions comprising:
placing a first basic object associated with a first basic point or a first varying object associated with a first varying point in each of multiple display areas of the terminal device, the multiple display areas contained in a game field on a display of the terminal device, in a manner such that a player can provide an input to the terminal device to select each of the objects;
detecting, by the terminal device, a selection operation of the player using the terminal device, by the player selecting at least one of the first basic objects placed in the display areas of the terminal or at least one of the first varying objects placed in the display areas at each of multiple turns;
generating as an output a conversion rate between the first basic points and the first varying points at each turn and at least a turn next to the turn as an output, and presenting the output to the player via the display of the terminal device at each of the multiple turns; and
determining acquired points to be acquired by the player at each turn on the basis of the first basic point when the first basic object is selected by the player by providing an input to an interface of the terminal device in the selection operation and/or the first varying point when the first varying object is selected by the selection operation, wherein
the first varying point at each of the multiple turns is calculated on the basis of the first basic point and the conversion rate at the turn.

16. A game providing method to be executed by terminal device, the method comprising:
placing a first basic object associated with a first basic point or a first varying object associated with a first varying point in each of multiple display areas of the terminal device, the multiple display areas contained in a game field on a display of the terminal device, in a manner such that a player can provide an input to the terminal device to select each of the objects;
detecting, by the terminal device, selection operation of the player using the terminal device, by the player selecting at least one of the first basic objects placed in the display areas of the terminal or at least one of the first varying objects placed in the display areas at each of multiple turns;
generating as an output a conversion rate between the first basic points and the first varying points at each turn and at least a turn next to the turn as an output, and presenting the output to the player via the display of the terminal device at each of the multiple turns; and
determining acquired points to be acquired by the player at each turn on the basis of the first basic point when the first basic object is selected by the player by providing an input to an interface of the terminal device in the selection operation and/or the first varying point when the first varying object is selected by the selection operation, wherein the first varying point at each of the multiple turns is calculated on the basis of the first basic point and the conversion rate at the turn.

* * * * *